Patented Jan. 17, 1933

1,894,865

UNITED STATES PATENT OFFICE

MAX HARTMANN AND HANS ISLER, OF RIEHEN, SWITZERLAND, ASSIGNORS TO FIRM SOCIETY OF CHEMICAL INDUSTRY IN BASLE, OF BASEL, SWITZERLAND

BASIC ETHER OF AROMATIC KETONES

No Drawing. Application filed August 20, 1931, Serial No. 558,420, and in Switzerland August 28, 1930.

The present invention relates to new basic ethers of aromatic ketones.

It has been found that basic ethers of aromatic ketones are obtained by introducing an amino alkyl residue or a derivative thereof according to known general methods into a hydroxyl group of an aromatic ketone containing nuclear hydroxyl or a substitution product thereof.

The new basic ethers may for instance be made by treating an aromatic ketone containing nuclear hydroxyl with a reactive ester of an amino alcohol or derivative thereof, preferably in presence of an acid binding agent. Another procedure consists in first causing the nuclear hydroxyl group to react with an alkylene compound, for example, an alkylene oxide, an alkylene halide, an alkylene dihalide or an alkylene halogen hydrin in such a manner that the product of the reaction still contains a reactive group, such as an alkylene group, hydroxyl group or halogen, and then replacing this group by an amino group, in some cases after previous treatment with a halogenating agent.

The side chain introduced into the nuclear hydroxyl group may be straight or branched and the amino group may be separated by any desired number of atoms from the oxygen of the hydroxyl group.

The new compounds are intended to be used for therapeutic purposes.

The following examples illustrate the invention the parts being by weight:—

Example 1.—1 part of para-hydroxyacetophenone, 2.5 parts of chlorethyldiethylamine hydrochloride, 6 parts of potash and 26 parts of acetone are heated to boiling for 14 hours whilst well stirring. The whole is then filtered and the acetone and excess of chlorethyl diethylamine removed from the filtrate by distillation. The residue is taken up in ether and the ethereal solution extracted with dilute alkali. The ethereal solution is then dried, the ether is distilled and the residue is subjected to distillation under reduced pressure. The para-diethylaminoethoxy-acetophenone of the formula

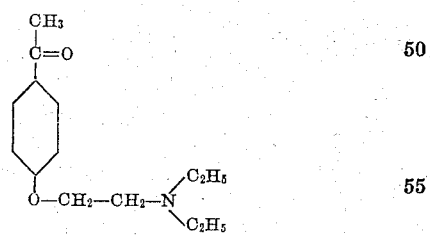

boils at 167–168° C. under a pressure of 5 millimetres. It is a wine-yellow oil which is insoluble in water and soluble in organic solvents. Its hydrochloride is readily soluble in water to a neutral solution.

The same base may also be made by causing para-bromo-ethoxyacetophenone to react with diethylamine at a raised temperature. The para-bromoethoxyacetophenone may itself be made, together with a small quantity of di-para-aceto-phenyl-glycoether of melting point 160–161° C. by boiling an alcoholic solution of para-hydroxyacetophenone with ethylene-bromide in presence of alkali; it is a colorless crystalline powder melting at 59–60° C.

Example 2.—1 part of 2-hydroxy-4-methoxyacetonephenone, 2.3 part of bromo-ethyl-diethylamine-hydrobromine, 5 parts of potash and 26 parts of acetone are heated to boiling for 10 hours. The product is worked up in the manner indicated in Example 1. The 2-diethylamino-ethoxy-4-methoxy-acetophenone of the formula

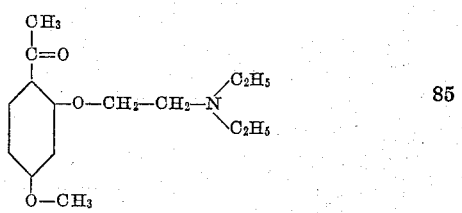

boils at 186–187° C. under a pressure of 5 millimetres. It is a wine-yellow oil which is readily soluble in organic solvents and in dilute acids.

*Example 3.*—3 parts of (2-hydroxy-4-methoxyphenyl)-benzyl-ketone, 1 part of sodium hydroxide, 20 parts of water and 2.2 parts of chlorethyl diethylamine hydrochloride are stirred together for 5 hours at 60° C. The base which precipitates is taken up in ether after cooling, the ethereal solution is washed with dilute alkali and the ether is distilled. By distillation of the residue there is obtained the (2-diethyl-amino-ethyloxy-4-methoxyphenyl)-benzyl-ketone of the formula

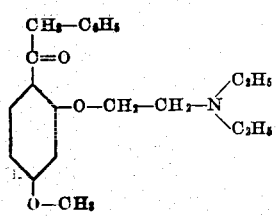

which boils at 210–211° C. under a pressure of 0.1 millimetre. It is a yellow oil which is insoluble in water but easily soluble in organic solvents and in dilute acids.

*Example 4.*—1 part of sodium is dissolved in 20 parts of absolute alcohol, 4.3 parts of para-hydroxybenzophenone and 6 parts of chlorethyl-dicyclohexylamine hydrochloride are added and the whole is boiled for 5 hours whilst stirring. After cooling, the sodium chloride is separated by filtration, the alcohol is removed from the filtrate by distillation and the residue is freed from unchanged chlorethyl-dicyclohexylamine by distillation under reduced pressure. The para-dicyclohexylamino-ethoxybenzophenone of the formula

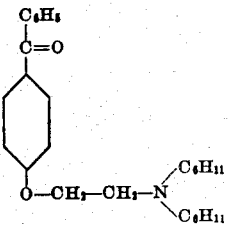

is a light yellow, viscous oil; it forms a picrate which melts at 157–158° C. after recrystallization from alcohol.

*Example 5.*—10 parts of 2-hydroxy-4-methoxy-acetophenone and 40 parts of ethylene bromide are boiled for several hours with a solution prepared by dissolving 1.6 parts of sodium in absolute alcohol. After removing the solvent, the residue is taken up in ether and the ethereal solution is washed with dilute potassium hydroxide solution and then with water. After evaporation of the ether, the excess of ethylene bromide is distilled under reduced pressure. The 2-bromoethoxy-4-methoxy-acetophenone remains as an oil which quickly solidifies; it forms colorless crystals of melting point 65–68° C.

1.1 parts of 2-bromoethoxy-4-methoxy-acetophenone and 1 part of methyl-benzylamine are boiled together for several hours in solution in benzene. After cooling, methyl-benzylamine-hydrobromide, which is precipitated, is removed by filtration, and the filtrate is extracted with dilute hydrochloric acid. The aqueous extract is rendered alkaline, the base which has precipitated is taken up in benzene and the benzene solution is dried over potash. After evaporation of the solvent the 2-methyl-benzylamino-ethoxy-4-methoxy-acetophenone of the formula

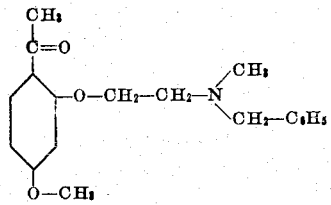

is distilled; it boils at 197.5–198° C. under a pressure of 0.12 millimetre and forms a yellow, viscous oil.

*Example 6.*—An excess of ethylene-oxide is introduced into a solution of 1 part of 2-hydroxy-4-methoxy-acetophenone in an equimolecular proportion of dilute potassium hydroxide solution, the whole is allowed to stand for some time and then extracted with ether. After concentrating the solution, 2-hydroxyethoxy-4-methoxy-acetophenone crystallizes in the form of a colorless crystalline powder of melting point 65–67° C.

A solution of equal parts of 2-hydroxyethoxy-4-methoxy-acetophenone and phosphorous pentachloride in chloroform is gently heated. When the reaction is completed the solvent and the phosphorous hydroxychloride which is formed are distilled under reduced pressure, the residue is taken up in ether and the ethereal solution washed with dilute alkali solution. After distilling the solvent 2-chlorethoxy-4-methoxy-acetophenone remains as a viscous oil which cannot be distilled without undergoing decomposition.

1.5 parts of 2-chlorethoxy-4-methoxy-acetophenone and 1 part of diethylamine are heated in solution in benzene for several hours at about 100° C. The solution is extracted with dilute hydrochloric acid and the base is precipitated from the aqueous extract by the addition of sodium carbonate. There is obtained 2-diethylamino-ethoxy-4-methoxy-acetophenone having the properties described in Example 2.

*Example 7.*—1 part of sodium is dissolved in 30 parts of alcohol and there are added first 7.2 parts of 2-hydroxy-4-methoxy-acetophenone and then 7.2 parts of 1-diethylamino-3-chloro-n-butane. The whole is boiled for several hours, separated from common salt, after cooling, by filtration, the alcohol is distilled and the residue taken up in ether. The ethereal solution is extracted with dilute hydrochloric acid, the aqueous extract is rendered alkaline and the base which separates is distilled. The 2-diethylamino-isobutyloxy-4-methoxy-acetophenone of the formula

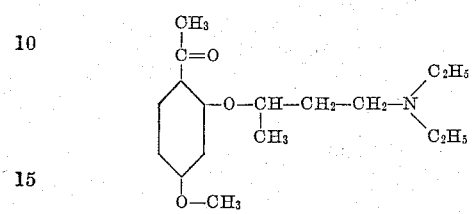

is a yellow oil which boils at 174–175° C. under a pressure of 0.5 millimetres.

The 1-diethylamino-3-chloro-n-butane used in the foregoing example may be obtained in the form of its hydrochloride by boiling β-diethylamino-ethyl-methyl-carbinol (obtainable by reduction of β-diethylamino-ethyl-methyl-ketone and boiling at 85–87° C. under a pressure of 22 millimetres) with thionyl chloride. The free base is a colorless mobile oil which boils at 67–70° C. under a pressure of 15 millimetres.

In an analogous manner there may be made, for example, the following compounds:

1. Meta-diethylaminoethoxy-acetophenone of the formula

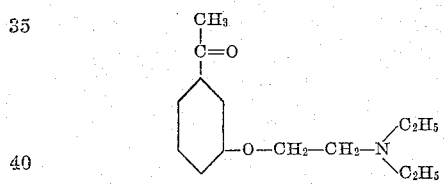

a yellow oil of boiling point 166–167° C. under a pressure of 6 millimetres.

2. 2-diethylaminoethoxy-4-methoxy-5-nitro-acetophenone of the formula

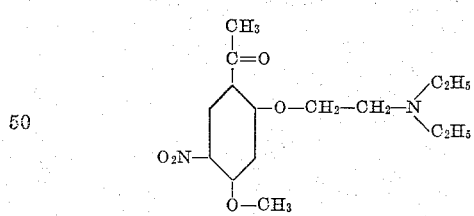

colorless crystals of melting point 124–125° C.; on reduction it yields 2-diethylaminoethoxy-4-methoxy-5-amino-acetophenone of the formula

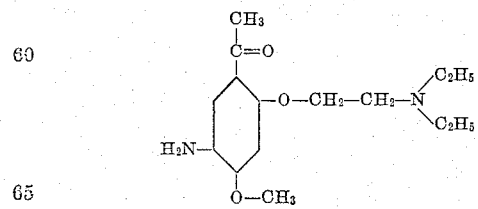

yellow needles of melting point 69–72° C.; whose acetylation product forms small colorless leaves of melting point 121–122° C.

3. 2-diethylaminoethoxy-4-n-butyloxy-acetophenone of the formula

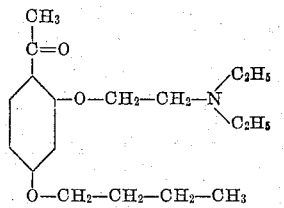

a yellow oil boiling at 166–167° C. under a pressure of 0.07 millimetres.

4. 2-diethylaminoethoxy-4-benzyloxy-acetophenone of the formula

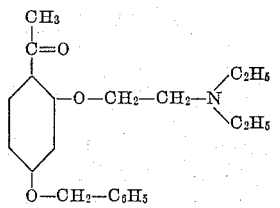

a yellow oil boiling at 206.5–207° C. under a pressure of 0.2 millimetres.

5. 1-diethylaminoethoxy-2-acetyl-naphthalene of the formula

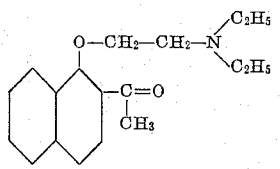

a light yellow oil boiling at 151–152° C. under a pressure of 0.15 millimetres.

6. 2-diethylaminoethoxy-4-methoxy-butyrophenone of the formula

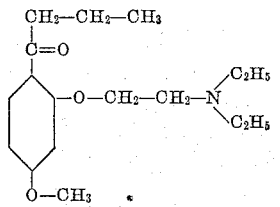

a yellow oil boiling at 196–199° C. under a pressure of 4 millimetres.

7. (para-diethylaminoethoxy-phenyl)-benzyl-ketone of the formula

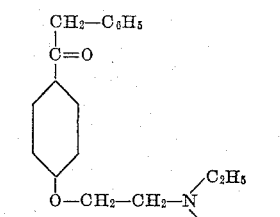

a colorless crystalline powder melting at 36–37° C. and boiling at 207–208° C. under a pressure of 3 millimetres.

8. (2-diethylaminoethoxy-4-benzyloxy-phenyl)-benzyl-ketone of the formula

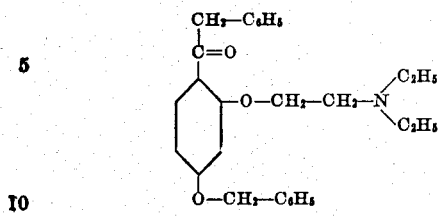

a wine-yellow viscous oil forming a picrate which melts at 158–159° C.

9. 2 - di-n-butylaminoethoxy - 4 - methoxy-acetophenone of the formula

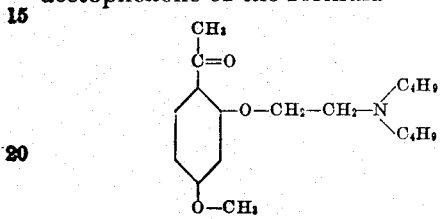

a yellow oil boiling at 179–180° C. under a pressure of 0.24 millimetres.

What we claim is:

1. Basic ethers of aromatic ketones of the general formula

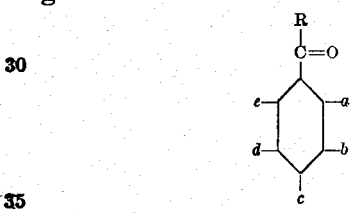

wherein R stands for alkyl, benzyl or phenyl and one of the letters $a$ and $c$ for hydrogen and the other for a group

A meaning an alkylene radicle containing at least two carbon atoms and $R_1$ and $R_2$ alkyl, hydrophenyl or benzyl, and wherein $b$, $d$, and $e$ stand for hydrogen, $b$ and $c$ may also stand for alkyloxy or benzyloxy or for part of a benzene ring, and $d$ for nitro or amino, which products form with acids water-soluble salts and are useful in therapeutics.

2. Basic ethers of aromatic ketones of the general formula

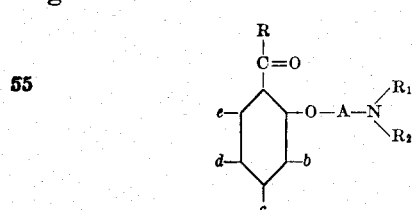

wherein R stands for alkyl, benzyl or phenyl, A for an alkylene radicle containing at least two carbon atoms, $R_1$ and $R_2$ for alkyl, hydrophenyl or benzyl, $b$, $c$, $d$, and $e$ for hydrogen $b$ and $c$ may also stand for alkyloxy or benzyloxy or for part of a benzene ring and $d$ for nitro or amino, which products form with acids water-soluble salts and are useful in therapeutics.

3. Basic ethers of aromatic ketones of the general formula

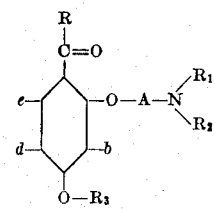

wherein R means alkyl, benzyl or phenyl, A means an alkylene radical containing at least two carbon atoms, $R_1$ and $R_2$ means alkyl, benzyl or hydrophenyl, and $R_3$ alkyl or benzyl, and wherein $b$ and $e$ stand for hydrogen, and $d$ for hydrogen, nitro or amino, which products form with acids water-soluble salts and are useful in therapeutics.

4. Basic ethers of aromatic ketones of the general formula

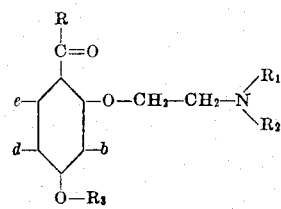

wherein R means alkyl, benzyl or phenyl, $R_1$ and $R_2$ mean alkyl, benzyl or hydrophenyl and $R_3$ alkyl or benzyl, and wherein $b$ and $e$ stand for hydrogen, and $d$ for hydrogen, nitro or amino, which products form with acids water-soluble salts and are useful in therapeutics.

5. Basic ethers of aromatic ketones of the general formula

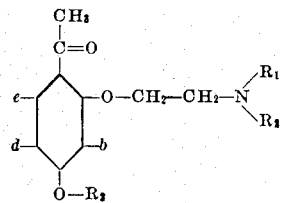

wherein $R_1$ and $R_2$ mean alkyl, benzyl or hydrophenyl and $R_3$ alkyl or benzyl, and wherein $b$ and $e$ stand for hydrogen, and $d$ for hydrogen, nitro or amino, which products form with acids water-soluble salts and are useful in therapeutics.

6. Basic ethers of aromatic ketones of the general formula

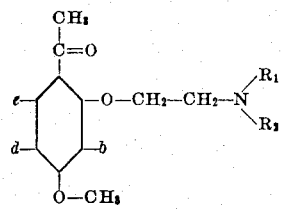

wherein $R_1$ and $R_2$ mean alkyl, benzyl or hydrophenyl, and wherein $b$ and $e$ stand for hydrogen, and $d$ for hydrogen, nitro or amino, which products form with acids water-soluble salts and are useful in therapeutics.

7. The 2-diethylaminoethoxy-4-methoxy-acetophenone of the formula

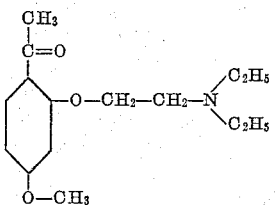

which is a wine-yellow oil of boiling point 186–187° C. at 5 mm. pressure, readily soluble in organic solvents and in dilute acids, said product being useful in therapeutics.

In witness whereof we have hereunto signed our names this 11th day of August 1931.

MAX HARTMANN.
HANS ISLER.